US012617736B2

(12) United States Patent
Holt et al.

(10) Patent No.: US 12,617,736 B2
(45) Date of Patent: May 5, 2026

(54) GRANULAR FERTILIZERS AND METHODS OF MAKING SAME

(71) Applicant: Pursell Agri-Tech, LLC, Sylacauga, AL (US)

(72) Inventors: Timothy Gene Holt, Florence, AL (US); Trenton Cole Gillis, Florence, AL (US)

(73) Assignee: Pursell Agri-Tech, LLC, Sylacauga, AL (US)

( * ) Notice: Subject to any disclaimer, the term of this patent is extended or adjusted under 35 U.S.C. 154(b) by 924 days.

(21) Appl. No.: 17/690,368

(22) Filed: Mar. 9, 2022

(65) Prior Publication Data

US 2022/0289641 A1     Sep. 15, 2022

Related U.S. Application Data

(60) Provisional application No. 63/160,181, filed on Mar. 12, 2021.

(51) Int. Cl.
*C05G 5/30* (2020.01)
*C05C 9/00* (2006.01)
(Continued)

(52) U.S. Cl.
CPC .............. *C05G 5/37* (2020.02); *C05C 9/005* (2013.01); *C05D 9/00* (2013.01); *C05G 1/00* (2013.01);
(Continued)

(58) Field of Classification Search
CPC ... C05G 5/37; C05G 1/00; C05G 3/44; C05G 3/50; C05G 5/38; C05G 5/30; C05C 9/005; C05C 3/005; C05D 9/00
See application file for complete search history.

(56) References Cited

U.S. PATENT DOCUMENTS 3,059,379 A     10/1962  Attoe
3,295,950 A      1/1967  Blouin et al.
(Continued)

FOREIGN PATENT DOCUMENTS

CN        104926532       9/2015
EP        2310344 B1      7/2018
(Continued)

OTHER PUBLICATIONS

Trenkel, "Controlled-Release and Stabilized Fertilizers in Agriculture", Improving Fertilizer Use Efficiency, Dec. 1997, pp. 1-151.
(Continued)

*Primary Examiner* — Jennifer A Smith

(74) *Attorney, Agent, or Firm* — Bradley Arant Boult Cummings LLP

(57) ABSTRACT

Coated granules and methods of making the coated granules that prevent the coated granules from floating and/or drifting due to water current and wind are disclosed. The coated granules may include a core having a water-soluble compound, such as a fertilizer; a controlled release layer; a surface treatment including a surfactant to reduce water tension; and an optional coating disposed between the controlled release layer and the surface treatment layer that includes a gelling agent, such as a super absorbent polymer, that may help to anchor the coated granules to the surface of the soil and reduces the chance of relocation due to rolling.

24 Claims, 3 Drawing Sheets

(51) Int. Cl.
C05D 9/00 (2006.01)
C05G 1/00 (2006.01)
C05G 3/40 (2020.01)
C05G 3/50 (2020.01)

(52) U.S. Cl.
CPC ................. C05G 3/44 (2020.02); C05G 3/50 (2020.02); C05G 5/38 (2020.02)

(56) References Cited

U.S. PATENT DOCUMENTS

| | | | |
|---|---|---|---|
| 4,711,659 A | 12/1987 | Moore | |
| 5,374,292 A | 12/1994 | Detrick et al. | |
| 5,538,531 A | 7/1996 | Hudson et al. | |
| 5,645,624 A * | 7/1997 | Naka ....................... | C05G 5/37 |
| | | | 71/64.11 |
| 5,803,946 A | 9/1998 | Petcavich et al. | |
| 5,964,917 A * | 10/1999 | Latting ................... | C05G 3/50 |
| | | | 71/64.11 |
| 6,231,633 B1 | 5/2001 | Hirano et al. | |
| 6,322,606 B1 | 11/2001 | Komoriya et al. | |
| 6,358,295 B1 | 3/2002 | Tabei et al. | |
| 6,663,686 B1 | 12/2003 | Geiger et al. | |
| 2002/0184933 A1* | 12/2002 | Bell, III .................. | C05G 3/20 |
| | | | 71/64.07 |
| 2003/0051523 A1* | 3/2003 | Tabei ...................... | C05G 5/37 |
| | | | 71/64.02 |
| 2012/0198898 A1* | 8/2012 | Fujii ...................... | A01N 25/26 |
| | | | 427/214 |
| 2014/0037570 A1* | 2/2014 | Whitehurst ............. | C07F 9/224 |
| | | | 71/30 |

FOREIGN PATENT DOCUMENTS

| | | | | |
|---|---|---|---|---|
| JP | 56-92188 | 7/1981 | | |
| JP | H0680514 | 3/1994 | | |
| JP | 10-167868 | 6/1998 | | |
| JP | H10152387 | 6/1998 | | |
| JP | H10291881 | 11/1998 | | |
| JP | 2000-128684 * | 5/2000 | .......... | C05G 3/0029 |
| JP | 2004-292319 | 10/2004 | | |
| JP | 2005067904 | 3/2005 | | |
| JP | 2011-178650 | 9/2011 | | |
| WO | WO-8903638 A * | 5/1989 | ............ | A01N 25/26 |
| WO | 2016130695 | 8/2016 | | |

OTHER PUBLICATIONS

Horie, et al. "Definitions of Terms Relating to Reactions of Polymers and to Functional Polymeric Materials", Pure Appl. Chem., vol. 76, No. 4, pp. 889-906, 2004.

International Search Report dated May 31, 2022 of corresponding International Patent Application No. PCT/US2022/019499.

Decision of Rejection dated Oct. 21, 2025 of corresponding Egyptian Patent Application No. EG/P/2023/01375.

Preliminary Rejection dated Dec. 11, 2025 of corresponding Brazilian Patent Application No. BR112023018312-0.

Office Action dated Oct. 21, 2025 of corresponding Chinese Patent Application No. 202280034546.1.

* cited by examiner

100

11a

100

GRANULAR FERTILIZERS AND METHODS OF MAKING SAME

TECHNICAL FIELD

The present disclosure relates generally to granular fertilizers and methods of making and using the same. More specifically, the present disclosure relates to coated fertilizer granules with a core including a water-soluble fertilizer material, a controlled release layer, an optional coating layer, and an outer surface treatment layer.

BACKGROUND

While there have been significant improvements in producing controlled release fertilizers, there is still a need for further advancements as it relates to crops that are grown in flooded conditions. For example, many of the coated fertilizers currently on the market share one common undesirable trait: they float. Once the coated granules begin to float, the water current and/or wind transports the fertilizer to areas low in plant population, and the areas of increased plant population cannot take advantage of the benefits provided by the controlled release fertilizer. The polymers and wax that generally make up the outer barriers of the fertilizers are very hydrophobic and will cause the granules to become buoyant. Large quantities of once uniformly distributed coated fertilizers on a farmer's field are relocated to the lowest elevation of the area. This undesirable occurrence is very common when farmers attempt to use coated fertilizers on pre-flood or post-flooded fields.

Accordingly, there remains a need in the art for preventing coated fertilizers from floating and drifting due to water current and wind.

SUMMARY

The problems expounded above, as well as others, are addressed by the following inventions, although it is to be understood that not every embodiment of the inventions described herein will address each of the problems described above. The present disclosure provides coated granules and methods of making the coated granules that facilitate one or both of sinking and sticking to the underlying surface (such as soil). The coated granules include a gelling agent that serves to anchor the coated granules to the surface of the soil and reduces the chance of relocation due to rolling. Some embodiments of the granule include an exterior wetting agent, such as a surfactant, that facilitates sinking.

In a first aspect, a coated fertilizer granule is provided, the coated fertilizer granule including a core that includes a water-soluble fertilizer material, a coating comprising a urethane layer impregnated with a super absorbent polymer, wherein the urethane layer is formed from a reaction product of one or both of (i) a polyol blended with the super absorbent polymer and reacted with isocyanate, and/or (ii) an isocyanate blended with the super absorbent polymer reacted with polyol; a controlled release layer disposed between the core and the coating; and a surface treatment layer disposed about the coating that includes a surfactant and a solvent.

In a second aspect, a coated granule is provided, the coated granule including a core that includes a water-soluble compound; a coating including a gelling agent; a controlled release layer between the core and the coating; and a surface treatment layer disposed about the coating that includes a surfactant and a solvent.

In a third aspect, a coated granule is provided, the coated granule including a urethane coating impregnated with an absorbent polymer and a core, wherein the urethane coating is formed from a reaction product of one or both of: (i) a polyol blended with the absorbent polymer and reacted with isocyanate; and (ii) an isocyanate blended with the absorbent polymer reacted with polyol. In one embodiment, the granule includes a core that includes a water soluble fertilizer material. In another embodiment, the granule includes a surface treatment layer disposed about the coating formed from a surfactant and a solvent.

In a fourth aspect, a fertilizer granule is provided that includes a core including a water-soluble fertilizer material, a controlled release layer disposed about the core; and a surface treatment layer disposed about the controlled release layer that includes a surfactant and a solvent.

In any of the above aspects, the surfactant may be an alcohol ethoxylate, a silicone-based surfactant, or a combination thereof. In another embodiment, the surfactant may be alkyl polyglycoside, ethoxylated sorbitan ester, polyhydric alcohol, or a combination thereof. In yet another embodiment, the surfactant is a blend of alkyl polyglycoside, ethoxylated sorbitan ester, and polyhydric alcohol. In any of the above aspects, the solvent may be tripropylene glycol.

In a fifth aspect, a method of making a coated fertilizer granule is provided, the method including providing a core that includes a water-soluble fertilizer material; applying a controlled release layer disposed over the core; applying a coating over the controlled release layer, the coating including a urethane layer impregnated with a super absorbent polymer, wherein the urethane layer is formed from a reaction product of one or both of (i) a polyol blended with the super absorbent polymer and reacted with isocyanate, and/or (ii) an isocyanate blended with the super absorbent polymer and reacted with polyol; and applying an outer surface treatment layer over the coating, the outer surface treatment layer including a surfactant and a solvent.

In a sixth aspect, a method of producing a controlled release granule is provided, the method including providing a core that includes a water-soluble compound; applying a controlled release layer over the core; applying a coating of a gelling agent over the controlled release layer; and applying an outer surface treatment layer over the coating.

In a seventh aspect, a method of making a coated granule is provided, the method including applying a urethane layer impregnated with a super absorbent polymer over a core, wherein the urethane layer is formed from a reaction product of one or both of: (i) a polyol blended with the super absorbent polymer and reacted with isocyanate; and (ii) an isocyanate blended with the super absorbent polymer and reacted with polyol.

In an eighth aspect, a method of making a fertilizer granule is provided, the method including applying a controlled release layer over a core, where the core includes a water-soluble fertilizer material; and applying a surface treatment layer over the controlled release layer that includes a surfactant and a solvent.

In any of the above methods of making a coated or fertilizer granule, the surfactant may be an alcohol ethoxylate, a silicone-based surfactant, or a combination thereof. In another embodiment, the surfactant may be alkyl polyglycoside, ethoxylated sorbitan ester, polyhydric alcohol, or a combination thereof. In yet another embodiment, the solvent may be tripropylene glycol.

In a ninth aspect, a coated or fertilizer granule produced by any one of the methods described above is provided.

In an tenth aspect, a method of releasing fertilizer is provided, the method including applying the coated or fertilizer granule to a soil, wherein the soil is pre-flooded or post-flooded for a period of time while the coated granule is present, and wherein the gelling agent becomes hydrated, thus forming a gel that aides in soil attachment.

In a eleventh aspect, a method of cultivating a plant is provided, the method including placing the coated or fertilizer granule of any one of the claims above in proximity to the plant to allow for a controlled release of the fertilizer.

The present disclosure is also directed to a coated fertilizer granule, including: a core including a water-soluble fertilizer material; a coating including a urethane layer impregnated with a gelling agent; a controlled release layer disposed between the core and the coating; and a surface treatment layer disposed on the coating and including a surfactant and a solvent. In one embodiment, the urethane layer is formed from a reaction product of one or both of (i) a polyol blended with the gelling agent and reacted with isocyanate, and/or (ii) an isocyanate blended with the gelling agent reacted with polyol. In another embodiment, the surfactant includes alcohol ethoxylate, a silicone-based surfactant, or a combination thereof. In yet another embodiment, the at least one surfactant includes alkyl polyglycoside, ethoxylated sorbitan ester, polyhydric alcohol, or a combination thereof. In still another embodiment, the surfactant includes a blend of alkyl polyglycoside, ethoxylated sorbitan ester, and polyhydric alcohol. The solvent may be selected from dipropylene glycol, tripropylene glycol, glycerin, propylene carbonate, vegetable oil, and combinations thereof.

In some aspects, the gelling agent is a super absorbent polymer. In still another embodiment, the gelling agent includes at least one of polyacrylamide, polyacrylate, vegetable starch, bentonite clay, or montmorillonite clay. The gelling agent may include a water absorbent polymer with a water retention ability of at least about 20 g water per g absorbent polymer.

In other aspects, the water-soluble fertilizer material includes a primary nutrient including urea, ammonium sulfate, calcium nitrate, diammonium phosphate, monoammonium phosphate, potassium nitrate, sodium nitrate, single superphosphate, triple superphosphate, calcium phosphate, monopotassium phosphate, dipotassium phosphate, tetrapotassium pyrophosphate, potassium metaphosphate, potassium chloride, potassium nitrate, potassium sulfate, or combinations thereof. In another aspect, the water-soluble fertilizer material further includes a secondary nutrient including calcium sulfate, calcium chloride, calcium carbonate, calcium silicate, calcium phosphate, magnesium sulfate, magnesium chloride, magnesium oxide, magnesium carbonate, elemental sulfur, ammonium sulfate, or combinations thereof.

The present disclosure also relates to a fertilizer granule, including: a core including a water-soluble fertilizer material; a surface treatment layer including a surfactant and a solvent; and a controlled release layer disposed between the core and the surface treatment layer, wherein the controlled release layer includes at least one urethane layer and at least one wax layer. In one embodiment, the controlled release layer includes a plurality of alternating urethane and wax layers. In another embodiment, the thickness of the controlled release layer is about 1 $\mu$m to about 150 $\mu$m. In still another embodiment, the fertilizer granule further includes a coating disposed between the controlled release layer and the surface treatment layer.

The present disclosure is also related to a method of making a coated fertilizer granule, including: providing a core including a water-soluble fertilizer material; applying a controlled release layer disposed over the core to form a controlled release core; applying a coating over the controlled release core to form a coated core, wherein the coating includes a urethane layer impregnated with a gelling agent; and applying a surface treatment layer over the coated core, the outer surface treatment layer including a surfactant and a solvent.

In one aspect, the urethane layer is formed from a reaction product of one or both of (i) a polyol blended with the gelling agent and reacted with isocyanate, and/or (ii) an isocyanate blended with the gelling agent and reacted with polyol. In another aspect, the gelling agent includes a super absorbent polymer. In still another aspect, the water-soluble fertilizer material includes a water-soluble pesticide. In yet another aspect, the solvent is selected from dipropylene glycol, tripropylene glycol, glycerin, propylene carbonate, vegetable oil, and combinations thereof.

BRIEF DESCRIPTION OF THE DRAWINGS

Further features and advantages can be ascertained from the following detailed description that is provided in connection with the drawings described below.

DETAILED DESCRIPTION

Figure 1:
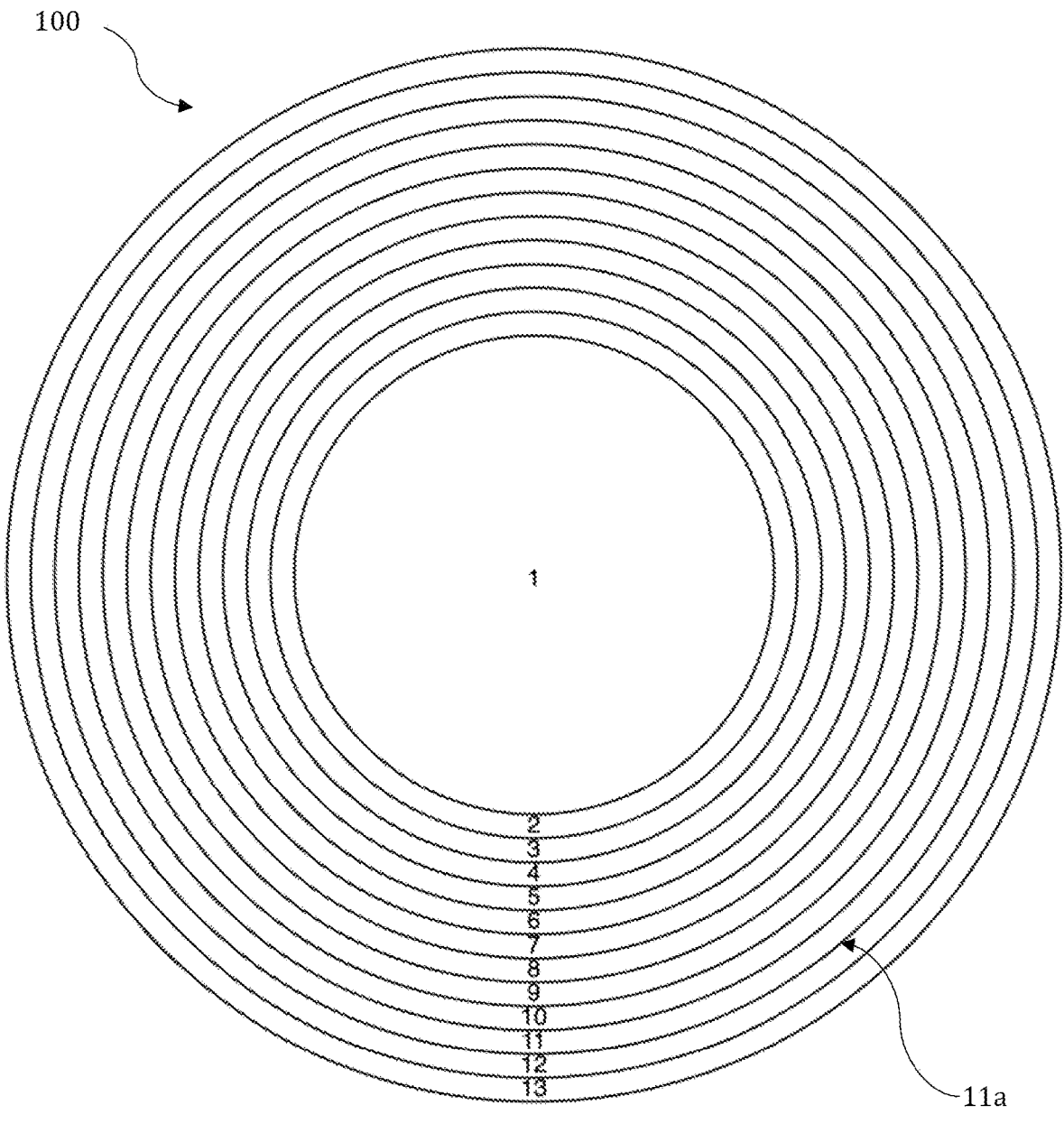
FIG. 1 is a diagram showing the layers of a coated granule according to an exemplary embodiment of the present disclosure.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, more preferably within 5%, and still more preferably within 1% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural (i.e., "at least one") forms as well, unless the context clearly indicates otherwise.

The terms "first", "second", and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Terms such as "at least one of A and B" should be understood to mean "only A, only B, or both A and B." The same construction should be applied to longer lists (e.g., "at least one of A, B, and C").

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

The term "may" as used herein refers to features that are optional (i.e., "may or may not,"), and should not be construed to limit what is described.

The term "over" as used herein refers to some layer, coating, or component, that is farther from the center of the granule than another. For example, "X is over Y" should be construed to mean that X is farther from the center of the granule than Y. X may be in direct contact with Y ("directly over"), or there may be an intervening distance/and or components. It is contemplated that any instance of the term "over" could be limited to "directly over."

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

Coated Granules

The present disclosure provides coated granules that are able to sink when dropped in stagnant water, resist movement as water passes over the granule, or both. The coated granules described herein are also able to produce a gelatinous encapsulating layer to provide a resistance to relocation by soil attachment. In some embodiments, the coated granules may have a particle size ranging from about 0.10 mm to about 20 mm. In another embodiment, the coated granules may have a particle size ranging from about 1.0 mm to about 5.0 mm. In still another embodiment, the coated granules may have a particle size ranging from about 2.5 mm to about 4.0 mm.

In one embodiment, about 80 percent to about 100 percent by weight of the coated granules (based on the total weight of the coated granules) fall within the particle sizes above. By way of example, in this aspect, about 80 percent to about 100 percent by weight of the coated granules have a particle size ranging from about 0.1 mm to about 20 mm, about 1.0 mm to about 5.0 mm, or 2.5 mm to about 4.0 mm depending on the embodiment. In another embodiment, about 85 percent to about 95 percent by weight of the coated granules (based on the total weight of the coated granules) fall within the particle sizes above. In this aspect, about 85 percent to about 95 percent by weight of the coated granules may have a particle size ranging from about 0.1 mm to about 20 mm, about 1.0 mm to about 5.0 mm, or 2.5 mm to about 4.0 mm depending on the embodiment. In yet another embodiment, about 88 percent to about 92 percent by weight of the coated granules (based on the total weight of the coated granules)

fall within the particle sizes above. In still another embodiment, about 90 percent to about 98 percent by weight of the coated granules (based on the total weight of the coated granules) fall within the particle sizes above. In yet another embodiment, about 92 percent to about 100 percent by weight of the coated granules (based on the total weight of the coated granules) fall within the particle sizes above. In still another embodiment, the particle size distribution calls for at least about 90 weight percent of the coated granules to fall within these size ranges.

FIG. 1 shows various layers of a coated granule 100 according to an exemplary embodiment of the present disclosure. As shown in FIG. 1, the coated granule 100 includes a core 1. The core 1 may include a water-soluble compound, such as a water-soluble fertilizer or pesticide. In one embodiment, the core 1 includes a water-soluble fertilizer. In this embodiment, the fertilizer may include a soluble bioavailable form of a primary nutrient. A "soluble bioavailable form" as used herein refers to an element or compound that is accessible to an organism for uptake or adsorption and is capable of being dissolved. The primary nutrient may be at least one of nitrogen, phosphorus, and potassium. For example, the primary nutrient may be in the form of at least one of urea, ammonium sulfate, calcium nitrate, diammonium phosphate, monoammonium phosphate, potassium nitrate, sodium nitrate, single superphosphate, triple superphosphate, calcium phosphate, monopotassium phosphate, dipotassium phosphate, tetra-potassium pyrophosphate, potassium metaphosphate, potassium chloride, and potassium sulfate. In one embodiment, the primary nutrient may be in the form of a urea fertilizer having at least 40% molecular weight nitrogen, more preferably 46% molecular weight nitrogen. The core 1 may be at least about 5 weight percent of the primary nutrient. Further embodiments of the core may have a minimum primary nutrient concentration of 10, 20, 30, 40, 50, 60, 70, 80, 90, 95, 96, 97, 98, and 99 weight percent. A specific embodiment of the core is 100 weight percent primary nutrient. In another embodiment, the core includes about 85 weight percent or more of the primary nutrient (based on the total weight of the core). In yet another embodiment, the primary nutrient constitutes between about 60 weight percent to about 100 weight percent of the core (based on the total weight of the core). In still another embodiment, about 70 weight percent to about 99 weight percent of the core (based on the total weight of the core) is the primary nutrient. In yet another embodiment, about 75 weight percent to about 95 weight percent of the core (based on the total weight of the core) is the primary nutrient.

In some embodiments, the core 1 may be a homogenous melt of nitrogen and one or both of potassium and phosphorous. In this embodiment, the ratios of nitrogen to phosphorous to potassium (N:P:K) may be, for example, 29-3-4, 22-3-14, 22-7-10, 21-7-14, 21-5-10, 20-28-5, 20-11-18, 20-5-10, 18-6-18, 16-4-8, 15-15-15, 15-5-10, 13-13-13, 12-11-18, 12-6-24, 10-10-10, 21-0-21, and 15-0-15.

In some embodiments, the fertilizer may include a soluble bioavailable form of a secondary nutrient. The secondary nutrient may be at least one of calcium, magnesium, and sulfur. For example, the secondary nutrient may be in the form of one or more of calcium sulfate, calcium chloride, calcium carbonate, calcium silicate, calcium phosphate, magnesium sulfate, magnesium chloride, magnesium oxide, magnesium carbonate, elemental sulfur, and ammonium sulfate. Certain embodiments of the core 1 may be about 0.5 weight percent to about 15 weight percent of the secondary nutrient (based on the total weight of the core). In further embodiments, the core 1 may be about 5 weight percent to about 10 weight percent of the secondary nutrient (based on the total weight of the core). Further embodiments of the core 1 may have a secondary nutrient content of 1, 2, 3, 4, 5, 6, 7, 8, 9, 10, 11, 12, 13, 14, or 15 weight percent (based on the total weight of the core). In another embodiment, the core includes about 85 weight percent or more of the secondary nutrient (based on the total weight of the core). In yet another embodiment, the primary nutrient constitutes between about 1 weight percent to about 8 weight percent of the core (based on the total weight of the core). In still another embodiment, about 1 weight percent to about 6 weight percent of the core (based on the total weight of the core) is the primary nutrient. In yet another embodiment, about 1 weight percent to about 5 weight percent of the core (based on the total weight of the core) is the primary nutrient.

In other embodiments, the fertilizer may include a micronutrient. The micronutrient may include one or more of boron, chlorine, copper, iron, manganese, molybdenum, nickel, and zinc. For example, the micronutrient may be in the form of one or more of boric acid, sodium borate, sodium tetraborate, sodium octa-borate, sodium metaborate, potassium borate, potassium tetraborate, potassium octa-borate, potassium metaborate, metal chlorides, copper chelate, copper chloride, copper oxide, copper sulfate, ferrous chloride, ferrous oxide, ferrous sulfate, ferric chloride, ferric oxide, ferric sulfate, manganese chelate, manganese chloride, manganese oxide, manganese sulfate, ammonium molybdate, sodium molybdate, nickel chelate, nickel nitrate, nickel sulfate, zinc chelate, zinc chloride, zinc oxide, zinc sulfate, and zinc oxy-sulfate. The core 1 may include about 0.01 wt. % to about 5.0 wt. % of the micronutrient. In another embodiment, the core 1 may include about 0.1 wt. % to about 2.0 wt. % of the micronutrient.

As shown in FIG. 1, a pre-coat layer 2 may optionally be disposed over the core 1. The pre-coat layer 2 may be used to fill and smooth over any surface irregularities of the fertilizer. The pre-coat layer 2 improves coating efficiency and the functionality of the overall coating. In one embodiment, the pre-coat layer 2 includes a layer of a non-reactive mineral and a reactive oil. For example, the pre-coat layer 2 may include a mineral powder of calcium carbonate carried by an epoxidized vegetable oil. In another embodiment, the pre-coat layer 2 may include a wax layer to slow the mechanism of diffusion and control the release of the fertilizer. The wax may be a paraffin, petrolatum, polyamide, micro crystalline wax or blends thereof. In another embodiment, the wax is a blend of at least two of the following waxes: an olefin wax, a paraffin wax, a petrolatum wax, a polyamide wax, and a micro crystalline wax. In one embodiment, the pre-coat layer 2 is applied to the fertilizer in an amount of about 0.01 weight percent to about 5 weight percent (based on the total weight of the coated granule). In another embodiment, the pre-coat layer 2 is applied to the fertilizer in an amount of about 0.25 weight percent to about 2 weight percent (based on the total weight of the coated granule). In still another embodiment, the pre-coat layer 2 is applied to the fertilizer in an amount of about 0.5 weight percent to about 1 weight percent (based on the total weight of the coated granule).

A controlled release layer for fertilizer nutrient release may be disposed over the core 1 (or the pre-coat layer 2 if utilized). As used herein, "controlled release layer" refers to a layer designed to slowly release any of the fertilizer nutrients described above in a prolonged controlled fashion. The controlled release layer may be comprised of a urethane layer and a wax layer. As illustrated in FIG. 1, the controlled release layer may include a plurality of alternating urethane layers 3, 5, 7, 9, 11 and wax layers 4, 6, 8, 10. While FIG. 1 exemplifies the use of five urethane layers and four wax layers, any number of alternating urethane and wax layers may be used depending on the desired total weight of the coating. In this regard, once the controlled release layer (regardless of the number or type of layers that are used therein) is disposed about the core 1 (or core 1 with optional pre-coat layer 2 thereon), the controlled release core will be referred to or denoted as 11a for the sake of convenience.

In one embodiment, the controlled release layer includes a urethane having a solubility of less than 0.10 g/L in deionized water at 100 kPa and 20° C. The urethane layer may be water impermeable or semipermeable. In a preferred embodiment, the urethane layer is semipermeable to allow for diffusion of water and the fertilizer through the controlled release layer. The urethane layer may be formed by reacting a polymer, such as polyol, with an isocyanate and curing the layer to form a durable layer.

The wax layer may be applied in between the urethane layers. The wax layer acts as a sealant that aids in the controlled release of the fertilizer nutrients. In one embodiment, the wax layer includes an olefin wax. For example, the olefin wax may be an alpha olefin wax having at least 20 carbon atoms, and more preferably at least 30 carbon atoms. In another embodiment, the wax may be a paraffin, petrolatum, polyamide, micro crystalline wax, or blends thereof. In another embodiment, the wax is a blend of at least two of the following waxes: an olefin wax, a paraffin wax, a petrolatum wax, a polyamide wax, and a micro crystalline wax.

In one embodiment, the controlled release layer is about 0.01 weight percent to about 20 weight percent of the total weight of the coated granule. For instance, the controlled release layer is about 5 weight percent to about 15 weight percent of the total weight of the coated granule. Each layer of the controlled release layer may be about 0.2 weight percent to about 5 weight percent of the total weight of the coated granule. In another embodiment, each layer of the controlled release layer may be about 0.3 weight percent to about 3 weight percent of the total weight of the coated granule. In still another embodiment, each layer of the controlled release layer may be about 0.5 weight percent to about 1.5 weight percent of the total weight of the coated granule.

In one aspect, the thickness of the controlled release layer may range from about 1 µm to about 150 µm. In another aspect, the thickness of the controlled release layer may range from about 2 µm to about 130 µm. In yet another aspect, the controlled release layer has a thickness of about 5 µm to about 100 µm. In still another aspect, the thickness of the controlled release layer is about 10 µm to about 75 µm. In yet another aspect, the controlled release layer has a thickness of about 30 µm to about 100 µm. In still another aspect, the controlled release layer has a thickness of about 1 µm to about 50 µm, about 2 µm to about 20 µm, or about 3 µm to about 10 µm.

In some embodiments, the controlled release layer allows for nutrients to be released from the core at a rate of at least about 4 percent of the total amount of nutrients in the core per every seven days. In another embodiment, the controlled release layer allows for nutrients to be released from the core at a rate of at least about 7 percent of the total amount of nutrients in the core per every seven days. In still another embodiment, the controlled release layer allows for nutrients to be released from the core at a rate of at least about 10 percent of the total amount of nutrients in the core per every seven days.

In other embodiments, the controlled release layer allows for nutrients to be released from the core over a time period of at least seven days. In another embodiment, the controlled release layer allows for nutrients to be released from the core over a time period of at least 21 days. In still another embodiment, the controlled release layer allows for nutrients to be released from the core over a time period of at least 35 days. In yet another embodiment, the controlled release layer allows for nutrients to be released from the core over a time period of at least 56 days. For example, the controlled release layer allows for nutrients to be released from the core over a time period of 70 days. In one aspect, the controlled release layer allows for nutrients to be released from the core for at least 90 days. In another aspect, the controlled release layer allows for nutrients to be released from the core for as long as 120 days.

In other aspects, after about 7 days, about 2 percent to about 25 percent of the nutrients (based on the total amount of nutrients in the coated granule) have been released from the core. For example, in one embodiment, about 4 percent to about 20 percent of the nutrients (based on the total amount of nutrients in the coated granule) have been released from the core after about 7 days. In still other aspects, after about 14 days, about 5 percent to about 55 percent of the nutrients (based on the total amount of nutrients in the coated granule) have been released from the core. For example, in one embodiment, about 15 percent to about 55 percent of the nutrients (based on the total amount of nutrients in the coated granule) have been released from the core after about 14 days. In yet other aspects, after about 21 days, about 10 percent to about 70 percent of the nutrients (based on the total amount of nutrients in the coated granule) have been released from the core. For example, in one embodiment, about 35 percent to about 65 percent of the nutrients (based on the total amount of nutrients in the coated granule) have been released from the core after about 21 days. In still other aspects, after about 70 days, about 65 percent to about 100 percent of the nutrients (based on the total amount of nutrients in the coated granule) have been released from the core. For example, in one embodiment, about 75 percent to about 100 percent of the nutrients (based on the total amount of nutrients in the coated granule) have been released from the core after about 70 days. In yet other aspects, after about 90 days, about 25 percent to about 1 percent of the nutrients (based on the total amount of nutrients in the coated granule) remain in the core. For example, in one embodiment, about 15 percent to about 1 percent of the nutrients (based on the total amount of nutrients in the coated granule) remain in the core after about 90 days. In still another embodiment, between about 90 percent and 100 percent of the nutrients (based on the total amount of nutrients in the coated granule) have been released from the core after about 120 days. In this aspect, 100 percent of the nutrients may have been released from the core after about 120 days.

As shown in FIG. 1, a coating 12 may be applied over the controlled release layer comprised of the alternating urethane layers 3, 5, 7, 9, 11 and wax layers 4, 6, 8, 10. The wax used in any of the wax layers of the coating may be an olefin wax. In one embodiment, wax may be paraffin, petrolatum, polyamide, micro crystalline wax, or blends thereof. In another embodiment, the wax is a blend of at least two of the following waxes: an olefin wax, a paraffin wax, a petrolatum wax, a polyamide wax, and a micro crystalline wax.

Figure 2:
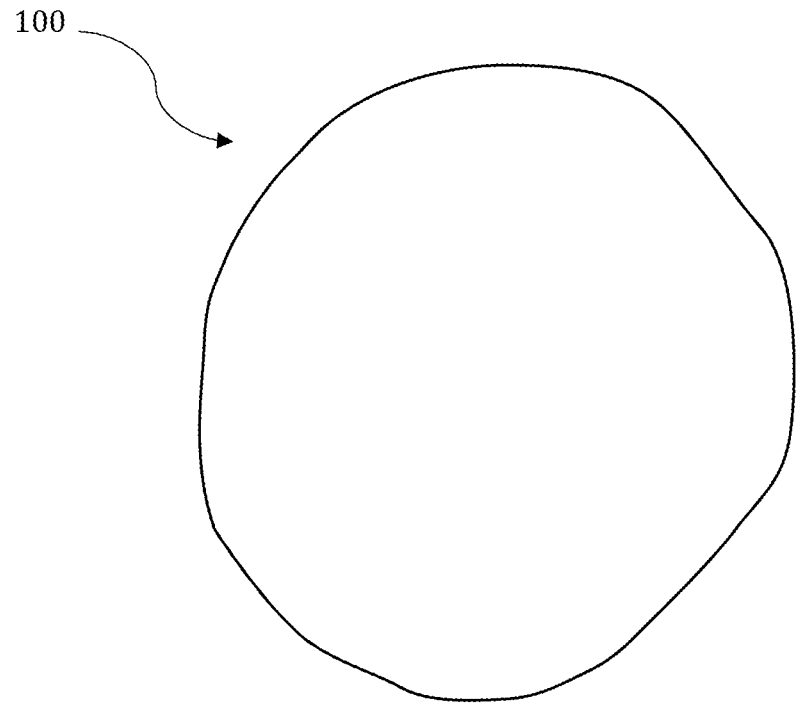
FIG. 2 shows a coated granule before the formation of a gelatinous encapsulating layer/coating.
Figure 3:
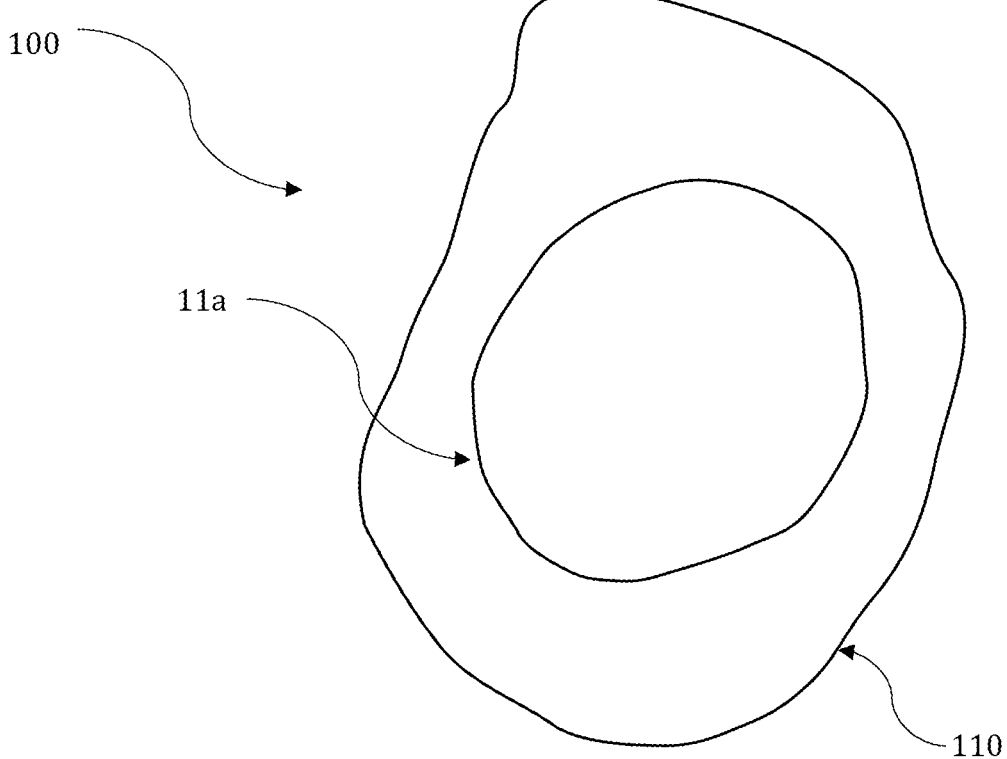
FIG. 3 shows a coated granule with the gelatinous encapsulating layer/coating according to an embodiment of the present disclosure.

In certain embodiments (and with certain surfactants used in the surface treatment layer), the coating 12 provides the benefits of soil attachment and sinking capabilities. In one embodiment, the coating 12 includes a gelling agent. The gelling agent advantageously prevents an accelerated release of fertilizer, which can otherwise occur when certain surfactants are present in the granule. Also, the coating 12 is positioned to allow hydration of the gelling agent when the coated granule contacts water. FIGS. 2 and 3 show the coated granule 100 before and after hydration of the gelling agent, respectively. As shown in FIG. 3, the gelling agent in the coating 12 creates a gelatinous mass 110 around the coated fertilizer upon exposure to liquid water. In the illustrated embodiment of the granule, the encapsulating gel utilizes its sticking abilities to prevent relocation of the fertilizer while also changing particle shape to avoid rolling. Without wishing to be bound by any hypothetical model, it is contemplated that the coating 12 may further encourage the formation of a nutrient-rich gel matrix, which provides a pathway for nutrient containment and an increased resistance to volatilization and leaching, and that the gel matrix functions as growth media for nutrient solubilizing microbes that improve soil and plant overall health.

In some embodiments, when included, the gelling agent in the coating 12 may include a water absorbent polymer. The absorbent polymer will have a high water retention ability, for example at least about 20 g water per g absorbent polymer. The absorbent polymer advantageously allows the coated granule to attach to the soil when the absorbent polymer is hydrated. For example, the gelling agent may contain a super absorbent polymer. A "super absorbent polymer" as used herein refers to a polymer that has a water-retention ability of at least about 50 g water per g absorbent polymer. Some embodiments of the super absorbent polymer have a water-retention ability of at least 100 g water per g absorbent polymer. Further embodiments of the super absorbent polymer may have a water-retention ability of at least 200 g water per g absorbent polymer. Still further embodiments may have a water-retention ability of at least about 280 g water per g absorbent polymer. In still further embodiments, the super absorbent polymer may have a water-retention ability of at least about 350 g water per g absorbent polymer. In yet another embodiment, the super absorbent polymer may have a water-retention ability of up to about 500 g water per g absorbent polymer. In yet another embodiment, the super absorbent polymer may have a water-retention ability of up to about 1000 g water per g absorbent polymer. In this aspect, the super absorbent polymer may have a water-retention ability of about 50 g to about 1000 g water per g absorbent polymer. For example, the water retention ability of the super absorbent polymer has a water-retention ability of about 200 g to about 1000 g water per g absorbent polymer.

The absorbent polymer may be an acrylate polymer, such as a sodium-based or potassium-based polyacrylate polymer, a vegetable starch, or a silicate. In one embodiment, the super absorbent polymer is a sodium-based or potassium-based polyacrylate polymer. In some embodiments, the super absorbent polymer may include particles having a particle size up to about 300 μm. For instance, the super absorbent polymer may include particles having a particle size up to about 200 μm. In still other embodiments, the super absorbent polymer may include particles having a particle size up to about 100 μm. In this aspect, the super absorbent polymer may include particles of about 1 μm to about 300 μm, about 1 μm to about 200 μm, about 1 μm to about 100 μm, or about 1 μm to about 50 μm.

In other embodiments, the gelling agent in the coating 12 may include at least one of polyacrylamide, polyacrylate, vegetable starch, bentonite clay, and montmorillonite clay. The gelling agent may comprise up to about 5 weight percent of the total weight of the coated granule. In another embodiment, the gelling agent may comprise about 0.1 weight percent to about 1.0 weight percent of the total weight of the coated granule. In still another embodiment, the gelling agent may comprise about 0.2 weight percent to about 0.5 weight percent of the total weight of the coated granule. Specific embodiments of the granule are 0.1, 0.2, 0.3, 0.4, 0.5, 0.6, 0.7, 0.8, 0.9, or 1.0 weight percent gelling agent.

The coating 12 may be formed of a urethane layer impregnated with the gelling agent. For example, the coating 12 may be formed of a urethane layer impregnated with the super absorbent polymer. In this embodiment, the urethane layer may be formed from a reaction product of one or both of (i) a polyol blended with the gelling agent, such as the super absorbent polymer, and reacted with isocyanate, and/or (ii) an isocyanate blended with the gelling agent, such as the super absorbent polymer, and reacted with polyol.

In one aspect, the thickness of the coating may range from about 1 μm to about 100 μm. In another aspect, the thickness of the coating may range from about 1 μm to about 75 μm. In yet another aspect, the coating has a thickness of about 1 μm to about 50 μm. In still another aspect, the thickness of the coating is about 1 μm to about 40 μm. In yet another aspect, the coating has a thickness of about 75 μm or less. In still another aspect, the coating has a thickness of about 70 μm or less, about 60 μm or less, or about 50 μm or less.

The coated granule 100 may include a surface treatment layer 13 applied over the coating 12, as shown in FIG. 1 (or, in other embodiments, directly over the controlled release layer). The surface treatment layer 13 reduces water surface tension, causing the coated granule to sink. In one embodiment, the surface treatment layer 13 includes a blend of a surfactant and a solvent. In one aspect, the surfactant may include at least one of an alcohol ethoxylate, a silicone-based surfactant, or a combination thereof. For example, the surfactant may be a Niax™ silicone L-5420 surfactant or a TDA-6 ethoxylate surfactant. In another aspect, the surfactant may include alkyl polyglycoside, ethoxylated sorbitan ester, polyhydric alcohol, or a combination thereof. In one embodiment, the surfactant is a blend of alkyl polyglycoside, ethoxylated sorbitan ester, and polyhydric alcohol. The solvent may be dipropylene glycol, tripropylene glycol, glycerin, propylene carbonate, vegetable oil, or combinations thereof. In one embodiment, the solvent is dipropylene glycol. In another embodiment, the solvent is tripropylene glycol.

The blend may include about 25 weight percent to about 100 weight percent of the surfactant and up to about 75 weight percent of the solvent. In one embodiment, the blend is comprised of the surfactant in an amount of 100 weight percent. In another embodiment, the blend may include about 25 weight percent to about 50 weight percent of the surfactant and about 50 weight percent to about 75 weight percent of the solvent. In still another embodiment, the blend may include about 35 weight percent to about 50 weight percent of the surfactant and about 50 weight percent to about 65 weight percent of the solvent. In still another embodiment, the blend may include about 50 weight percent to about 65 weight percent of the surfactant and about 35 weight percent to about 50 weight percent of the solvent. In yet another embodiment, the blend may include about 50 weight percent to about 75 weight percent of the surfactant and about 25 weight percent to about 50 weight percent of the solvent.

In some embodiments, the surface treatment layer 13 may account for about 0.01 weight percent to about 5 weight percent of the total weight of the coated granule. In another embodiment, the surface treatment layer 13 may account for about 0.1 weight percent to about 1 weight percent of the total weight of the coated granule. In still another embodiment, the surface treatment layer 13 may account for about 0.15 weight percent to about 0.5 weight percent of the total weight of the coated granule.

In one aspect, the thickness of the surface treatment layer may range from about 0.5 μm to about 30 μm. In another aspect, the thickness of the surface treatment layer may range from about 0.5 μm to about 10 μm. In yet another aspect, the surface treatment layer has a thickness of about 1 μm to about 5 μm.

The final coated granule 100 utilizes the controlled release layer of alternating urethane layers 3, 5, 7, 9, 11 and wax layers 4, 6, 8, 10 to provide a controlled nutrient release of fertilizer. In certain embodiments, the coating 12 impregnated with the gelling agent causes the coated fertilizer to stick to the soil by producing an encapsulating gelatinous layer around each individual particle. In this aspect, the surface treatment layer 13 reduces surface tension of water, causing the coated fertilizer to sink to the soil's surface. In one embodiment, the combined functionality of the final coated granule 100 has the properties of controlled release of fertilizer nutrients, resistance to floating, and soil adhesiveness that ensures the coated granules remain in close proximity to the plant being fertilized. In some embodiments that employ certain surfactants in the surface treatment layer, the gelling agent may serve to slow the release of the soluble compounds that might otherwise be released too quickly in the presence of these certain surfactants alone.

In an alternate embodiment, a fertilizer granule may be formed without a coating 12. For example, in certain embodiments, the fertilizer granule may include a core, a controlled release layer disposed about the core, and a surface treatment layer 13 disposed on the controlled release layer. In this aspect, the surface treatment layer 13 may be formed from a surfactant and solvent where the surfactant is a blend of alkyl polyglycoside, ethoxylated sorbitan ester, and polyhydric alcohol. The solvent may be any of the solvents discussed previously. For example, the solvent may be tripropylene glycol.

Methods of Making the Coated Granules

The present disclosure also provides methods of making the coated granules described above. In one embodiment, the method includes providing the core 1 comprised of the fertilizer. The core 1 may be charged to a coater to pre-heat. In one embodiment, the core 1 is heated to a temperature of about 140° F. to about 165° F. In another embodiment, the core 1 is heated to about 145° F. to about 163° F. In still another embodiment, the core 1 is heated to about 150° F. to about 162° F. In yet another embodiment, the core 1 is heated to about 150° F. to about 160° F. After the core 1 is heated, the optional pre-coat layer 2 may applied to the core 1. As discussed above, the pre-coat layer 2 may be applied to cores having irregular surfaces to smooth the surface and increase coating efficiency. The pre-coat layer 2 may be applied by spraying or pouring onto the core 1. In some embodiments, the pre-coat layer 2 may be allowed a sufficient amount of time to set in order to ensure uniform distribution of the coating. For example, the pre-coat layer 2 may be allowed about 45 seconds to about 2 minutes to set in order to ensure uniform distribution of the coating. In another embodiment, the pre-coat layer 2 is allowed about 50 seconds to about 75 seconds to set. In yet another embodiment, the pre-coat layer 2 is allowed about 55 seconds to about 65 seconds to set.

The method may further include applying the controlled release layer formed of the one or more urethane layers 3, 5, 7, 9, 11 and wax layers 4, 6, 8, 10 over the core 1 or the pre-coat layer 2 if utilized. In one embodiment, the method may include forming the urethane layer by applying a polyol and an isocyanate onto the core 1 (or, if present, the pre-coat layer 2) and allowing the layer to cure for a time period of about 45 seconds to about 2 minutes, about 45 second to about 90 seconds, or about 45 seconds to about 60 seconds. After the urethane layer is formed, the wax layer may be applied over the urethane layer. In some embodiments, the wax layer may be allowed to evenly spread over the urethane layer for at least about 30 seconds. In one embodiment, the wax layer may be allowed to set for about 30 seconds to about 90 seconds. In this aspect, the wax layer may be allowed to set for about 30 seconds to about 60 seconds. The procedure for forming the urethane layer and the wax layer may be continuously repeated to reach the desired coating weight and thickness.

After application of the controlled release layer, in some embodiments, the method includes applying the coating 12, including the gelling agent, over the controlled release layer to ensure the coated granules have soil sticking capabilities. In other embodiments, the method includes forming the coated granules without the coating 12, i.e., with a surface treatment layer disposed about the controlled release layer. When the coating is included, the step for applying the coating 12 may include blending the gelling agent, such as the super absorbent polymer, with a polyol and reacting the blend of the gelling agent and the polyol with an isocyanate to form a urethane layer impregnated with the gelling agent, such as the super absorbent polymer. In another embodiment, the step for applying the coating 12 may include blending the gelling agent, such as the super absorbent polymer, with an isocyanate and reacting the blend of the gelling agent and the isocyanate with a polyol to form a urethane layer impregnated with the gelling agent, such as the super absorbent polymer. In one embodiment, after application of the coating 12, the method may include allowing the coated granule to cool to a temperature of about 80° F. to about 120° F., about 90° F. to about 110° F., or about 95° F. to about 105° F. prior to applying the surface treatment layer 13.

In some embodiments, the method includes applying the outer surface treatment layer 13 over the coating 12 (or, in some embodiments, directly onto the controlled release layer) to promote sinking when dropped in liquid water and resistance to relocation as liquid water passes over coated granules. The application of the surface treatment layer 13 may occur in a rotary drum, blender, or equipment that encourages adequate particle rolling and tumbling. The application of the surface treatment layer 13 may be performed by spraying, dripping, and/or pouring the contents of the surface treatment layer 13 onto moving granules so long as uniform coverage is achieved. After a time period of about 30 seconds to about 180 seconds, e.g., about 45 second to about 60 seconds, the finished coated granules may be prepared for storage or bagging.

Methods of Use

The coated granules described herein may be used to release fertilizer in a controlled manner. The present disclosure provides a method of releasing fertilizer. The method includes applying the coated granule described herein to a soil that is pre-flooded or post-flooded for a period of time while the coated granule is present. The gelling of the coated granule becomes hydrated and thus forms a gel that aides in soil attachment. In this embodiment, the controlled release layer maintains its integrity upon hydration of the gelling agent and surfactant/solvent surface treatment. Examples of suitable flooded soils include a rice (*Oryza* sp.) paddy, a cranberry bog, a water chestnut field, a water spinach field, a watercress field, a wild rice (*Zinzania* sp.) field, a sugar cane field, and a taro field.

In other embodiments, the present disclosure provides a method of cultivating a plant. The method includes placing the coated granule described herein in proximity to the plant to allow for a controlled release of the fertilizer. The plant may be any cultivated plant. In some preferred embodiments the plant is rice (*Oryza* sp.), cranberry, water chestnut, water spinach, watercress, wild rice (*Zinzania* sp.), or taro.

EXAMPLES

A mixer for producing the coated granules described in the below examples includes an independent, variable speed rotating container and an independent, variable speed mixing rotor to ensure uniform coating distribution on the coated granules. The rotor is comprised of a shaft with accompanying angled blades that encourage intense particle mixing. The container and rotor are controlled by variable frequency drives and motors. A stationary scraper is mounted inside the container to minimize coating buildup and assists in granule agitation. Core fertilizer components may be added through an inlet opening. Coating components are accurately measured and independently charged to the coater using a series of open-end pipes. The coated granules exit by an open/close door hopper positioned under the coater.

Example 1: Coated Granules Containing Urea

The mixer was preheated to a temperature of about 100° F. to about 120° F. During the preheat, the rotating container and rotor were operated in the clockwise direction at 6.00 m/s and 1.95 m/s, respectively. The mixer was charged with 4536 g of uncoated urea with an average particle diameter of 3.0 to 3.5 mm. The uncoated urea was allowed to preheat to a temperature of approximately 150° F. to 160° F. Once the uncoated urea was preheated, the mixer parameters were adjusted for the coating process. The rotating pan operated in the clockwise direction at a speed of 12.00 m/s, while the rotor operated in the counterclockwise direction at a speed of 6.00 m/s. The mixer was then charged with 14.6 g polyol, allowed to mix for 30 seconds, and then charged with 23.4 g of isocyanate. After these components were allowed to roll and react for 60 seconds, a 5.9 g charge of wax was added and allowed to roll an additional 30 seconds. The polyol, isocyanate and wax addition steps and mixing times were repeated. A charge of polyol and isocyanate was then added to achieve the desired coating thickness for the controlled release layer. The controlled release coated cores were allowed to roll and cure for 60 seconds.

The coating layer required to achieve soil sticking capabilities was produced by first charging the mixer, containing the controlled release coated cores, with 29.6 g of isocyanate and allowed to mix for 30 seconds to ensure uniform coverage of all coated cores. A second charge of 33.5 g of a polyol/polymer blend, containing 55 wt. % polyol and 45 wt. % super absorbent polymer, was added. The coated granule was mixed for an additional 60 seconds before the mixer rotation was slowed to 6.00 m/s and the rotor speed reduced to 1.95 m/s. The coated granules were cooled to approximately 100° F. to 110° F. with ambient temperature air supplied by a blower. The coated granules were then discharged from the mixer and allowed to cool to ambient temperature.

The surface treatment for promoting particle sinking was carried out by charging a predetermined amount of the coated granules to a rotary drum that gently tumbled the granules at a rotational speed of 28 RPM. The coated granules were then treated with a surfactant/solvent blend comprised of 25 wt. % Niax L-5420 silicon surfactant and 75 wt. % dipropylene glycol (DPG). The treated particles were allowed to roll for approximately 60 seconds to ensure uniform coverage before being discharged from the drum, packaged, and labeled.

Example 2: Coated Granules Containing AMIDAS®

A mixer similar to the one utilized in Example 1 was operated at the same temperature and rotational speed. The mixer was charged with 4536 g of AMIDAS®, a substrate with irregular and rough surfaces. This substrate required a pre-coat layer. The mixer was charged with 23.9 g of a pre-coat blend containing 50 wt. % epoxidized soybean oil (ESO) and 50 wt. % calcium carbonate. A 60 second roll time was allowed before applying the same coating steps and treatments as those applied in Example 1. The total coating was 6.5 wt. % of the final product weight.

Example 3: Coated Granules Containing Urea Core with Pre-Coat

A mixer similar to the ones utilized in Examples 1 and 2, operated at the same parameters, was charged with 4536 g of uncoated urea. A pre-coat layer was applied to improve the coating longevity. The mixer was charged with 48.0 g of molten wax. The mixer was allowed a 60 second rolling time before applying the same coating steps and treatments as those applied in Examples 1-2. The total coating was 7.0 wt. % of the final product weight.

Example 4: Coated Granule with Urea Core

A mixer similar to the ones described in the previous examples, operated at the same parameter, was charged with 4536 g of uncoated urea. The uncoated urea was allowed to preheat to a temperature of approximately 150° F. to 160° F. The rotating pan operated in a clockwise direction while the rotor rotated in a counterclockwise direction. The mixer was charged with 13.6 g polyol, allowed to mix and evenly distribute over the granules surfaces for approximately 30 seconds, and then charged with 21.8 g of isocyanate. After these components were allowed to roll and react for an additional 60 seconds, a 7.9 g charge of wax was added and allowed to roll and react for an additional 30 seconds. The polyol, isocyanate, and wax addition steps and mixing times were repeated. A charge of polyol and isocyanate was then added to achieve the desire coating thickness for the controlled release coating to form controlled release coated cores. The controlled release coated cores were cooled to approximately 100° F. to 110° F. with an ambient temperature air supplied by a blower.

Once the controlled release coated cores were cooled to room temperature and the controlled release coating was fully reacted, 1000 grams of the controlled release cores were charged to a rotary coating drum. The rotary drum was equipped with ¼ inch diameter anti-slip rod internals that were equally spaced around the inside circumference of the drum shell. The anti-slip rod drum internals were installed to promote a rolling action of the controlled release coated cores and encourage particle to particle surface contact. The controlled release coated cores were preheated to a temperature of approximately 120° F. to 130° F. A coating layer was then applied by first charging 1.6 g of isocyanate and allowing 60 seconds to ensure uniform coverage of all the controlled release coated cores, followed by a second charge of 3.4 g of a polyol/polymer blend, containing 55 wt. % polyol and 45 wt. % super absorbent polymer. The coated granules were mixed for an additional 180 seconds to ensure that the polymer was fully reacted, and the granules were free flowing. The coated granules were cooled to approximately 100° F. to 110° F. with an ambient temperature air supplied by a blower. The drum rotational speed was 32 RPM.

A surface treatment was then carried out by charging 800 g of the previously formed coated granules to a rotary drum that gently tumbled the granules at a rotational speed of 28 RPM. The coated granules were then treated with 2 g of a surfactant/solvent blend that included 40 wt. % of surfactant blend 1 Å and 60 wt. % dipropylene glycol (DPG). The treated particles were allowed to roll for approximately 90-120 seconds to ensure uniform coverage before being discharged from the drum, packaged, and labeled.

Example 5: Non-Floating Surface Treated Granule with Urea Core

A mixer similar to the ones described in the previous examples, operated at the same parameter, was charged with 4536 g of uncoated urea. The uncoated urea was allowed to preheat to a temperature of approximately 150° F. to 160° F. The rotating pan operated in a clockwise direction while the rotor rotated in a counterclockwise direction. The mixer was charged with 13.6 g polyol, allowed to mix and evenly distribute over the granules surfaces for approximately 30 seconds, and then charged with 21.8 g of isocyanate. After these components were allowed to roll and react for an additional 60 seconds, a 7.9 g charge of wax was added and allowed to roll and react for an additional 30 seconds. The polyol, isocyanate, and wax addition steps and mixing times were repeated. A charge of polyol and isocyanate was then added to achieve the desire coating thickness for the controlled release coating. The controlled release coated core was cooled to approximately 100° F. to 110° F. with an ambient temperature air supplied by a blower.

A surface treatment for promoting particle sinking was carried out by charging 800 g of the controlled release coated cores to a rotary drum that gently tumbled the cores at a rotational speed of 28 RPM. The controlled release coated cores were then treated with 2 g of a surfactant/ solvent blend comprised of 40 wt. % of a surfactant blend 1 Å and 60 wt. % dipropylene glycol (DPG). The treated granules were allowed to roll for approximately 90-120 seconds to ensure uniform coverage before being discharged from the drum, packaged, and labeled.

Example 6: Coated Urea

Coated granules were formed in accordance with Example 1 except that the coated granules were treated with surfactant blend 11 Å and 75 wt. % tripropylene glycol (TPG). The treated particles were allowed to roll for approximately 60 seconds to ensure uniform coverage before being discharged from the drum, packaged, and labeled.

The specifications of Examples 1-6, including the varying additive type and amounts, were tracked and recorded in Table 1 shown below. The coating weight and additive amounts are percentages based on the total weight of the final coated granules.

with a refractometer so that a calibration curve of refractive index vs. concentration could be constructed. Then, 10 g of coated granules for each of the different types of granules (Trials 1-17) in Table 1 were accurately weighed into a small jar and 100 g of water was added. The sample was gently swirled and allowed to rest until the required measurement time. Before each new measurement, the sample was gently swirled to ensure uniformity. A small sample of the solution was placed on the refractometer, and the measurement was recorded. Comparison to the calibration curve provides the

TABLE 1

| | | | | | | | | | |
|---|---|---|---|---|---|---|---|---|---|
| | | Specifications for Coated Granules of Examples 1-6 | | | | | | | |
| | | | | Absorbent Polymer for Soil Attachment | | | | | |
| | Substrate | | | Particle | Added | | | Surfactant Blend to Reduce | |
| Trial | Composition | Diameter (mm) | Base Composition | Size (μm) | Amount (%) | Surfactant | Solvent | Tension Added Amount (%) | Coating Weight (%) |
| 1 | Urea | 3.0-3.5 | Sodium | 0-100 | 0.30 | Niax | DPG | 0.25 | 6.00 |
| 2 | Urea | 2.5-3.0 | Sodium | 0-300 | 0.30 | Niax | DPG | 0.25 | 6.00 |
| 3 | Urea | 2.5-3.0 | Sodium | 0-100 | 0.20 | Niax | DPG | 0.25 | 5.40 |
| 4 | Urea | 3.0-3.5 | Sodium | 0-100 | 0.20 | Niax | DPG | 0.25 | 5.40 |
| 5 | Urea | 3.0-3.5 | Sodium | 0-100 | 0.10 | Niax | DPG | 0.25 | 5.10 |
| 6 | Urea | 3.0-3.5 | Sodium | 0-100 | 0.20 | Niax | DPG | 0.25 | 4.40 |
| 7 | Urea | 3.0-3.5 | Potassium | 0-100 | 0.30 | Niax | DPG | 0.25 | 6.00 |
| 8 | Urea | 3.0-3.5 | Vegetable Starch | 0-100 | 0.30 | Niax | DPG | 0.25 | 6.00 |
| 9 | Urea | 3.0-3.5 | Sodium | 0-100 | 0.30 | Niax | Glycerin | 0.25 | 6.00 |
| 10 | Urea | 3.0-3.5 | Sodium | 0-300 | 0.30 | Niax | Glycerin | 0.25 | 6.00 |
| 11 | Urea | 2.5-3.0 | Sodium | 0-100 | 0.30 | Niax | Glycerin | 0.25 | 6.00 |
| 12 | Urea | 3.0-3.5 | Sodium | 0-100 | 0.30 | Niax | Propylene Carbonate | 0.25 | 6.00 |
| 13 | AMIDAS ® | 3.0-3.5 | Sodium | 0-100 | 0.30 | Niax | DPG | 0.25 | 6.40 |
| 14 | Urea | 3.0-3.5 | Potassium | 0-100 | 0.25 | Blend 1A | DPG | 0.25 | — |
| 15 | Urea | 3.0-3.5 | Potassium | 0-100 | 0.25 | Blend 1A | DPG | 0.25 | — |
| 16 | Urea | 3.0-3.5 | N/A | N/A | N/A | Blend 9A | DPG | 0.25 | — |
| 17 | Urea | 3.0-3.5 | Potassium | 0-100 | 0.17 | Blend 11A | TPG | 0.25 | — |

Example 7: Determining Rate of Nutrient Release from Coated Granules

Nutrient solutions were prepared by dissolving a variety of known concentrations of nutrients in distilled water. The refractive index of the known concentrations was measured nutrient concentration in the solution. The percentage of nutrients released from the coated granules was calculated. The experiment was carried out at ambient temperature, for example, 22° C. The measured rates of nutrient release are shown in Table 2 below.

TABLE 2

| | | | | | | | | | | |
|---|---|---|---|---|---|---|---|---|---|---|
| | Nutrient Release of Coated Granules of Examples 1-3 | | | | | | | | | |
| | Nutrient Release Rate (%) at 22° C. | | | | | | | | | |
| Trial | 7 Day | 14 Day | 21 Day | 28 Day | 35 Day | 42 Day | 49 Day | 56 Day | 63 Day | 70 Day |
| 1 | 11 | 19 | 33 | 45 | 56 | 65 | 74 | 81 | 88 | 100 |
| 2 | 7 | 23 | 39 | 51 | 61 | 69 | 77 | 83 | 89 | 94 |
| 3 | 10 | 22 | 41 | 58 | 73 | 85 | 96 | 100 | — | — |
| 4 | 12 | 19 | 33 | 46 | 57 | 67 | 76 | 84 | 91 | 100 |
| 5 | 10 | 22 | 40 | 56 | 70 | 82 | 93 | 100 | — | — |
| 6 | 23 | 48 | 66 | 79 | 90 | 98 | 100 | — | — | 94 |
| 7 | 4 | 22 | 37 | 50 | 60 | 69 | 76 | 83 | 89 | 95 |
| 8 | 5 | 18 | 33 | 46 | 57 | 67 | 75 | 82 | 89 | — |
| 9 | 7 | 15 | 36 | 56 | 73 | 87 | 100 | — | — | 83 |
| 10 | 21 | 42 | 53 | 60 | 66 | 71 | 74 | 78 | 81 | 94 |
| 11 | 7 | 23 | 39 | 51 | 61 | 69 | 77 | 83 | 89 | — |
| 12 | 10 | 24 | 43 | 60 | 74 | 87 | 98 | 100 | — | — |
| 13 | 25 | 51 | 65 | 75 | 82 | 88 | 93 | 98 | 100 | — |
| 14 | 8 | 17 | 30 | 42 | 51 | 60 | 67 | 74 | 80 | — |
| 15 | 2 | 5 | 11 | 17 | 28 | 37 | 46 | 54 | 60 | — |
| 16 | 4 | 17 | 30 | 40 | 49 | 56 | 63 | 69 | 74 | — |
| 17 | 19 | 29 | 41 | 51 | 59 | 66 | 73 | 79 | 84 | — |

19

20

As shown in Table 2, the coated granules provide for a controlled release of nutrients over a time period of at least 49 days. In some instances, the coated granules provide for a controlled release of nutrients over a time period of up to 70 days.

The foregoing description illustrates and describes the processes, manufactures, compositions of matter, and other teachings of the present disclosure. Additionally, the disclosure shows and describes only certain embodiments of the processes, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, manufactures, compositions of matter, and other teachings of the present disclosure and to enable others skilled in the art to utilize the teachings of the present disclosure in such, or other, embodiments and with the various modifications required by the particular applications or uses. Accordingly, the processes, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. A coated fertilizer granule, comprising:
a core comprising a water-soluble fertilizer material;
a coating comprising a urethane layer impregnated with a gelling agent;
a controlled release layer disposed between the core and the coating; and
a surface treatment layer disposed on the coating and comprising a surfactant and a solvent, wherein the surfactant comprises alkyl polyglycoside, ethoxylated sorbitan ester, polyhydric alcohol, or a combination thereof.

2. The coated fertilizer granule of claim 1, wherein the urethane layer is formed from a reaction product of one or both of (i) a polyol blended with the gelling agent and reacted with isocyanate, and/or (ii) an isocyanate blended with the gelling agent reacted with polyol.

3. The coated fertilizer of claim 1, wherein the surfactant comprises a blend of alkyl polyglycoside, ethoxylated sorbitan ester, and polyhydric alcohol.

4. The coated fertilizer of claim 1, wherein the solvent is selected from dipropylene glycol, tripropylene glycol, glycerin, propylene carbonate, vegetable oil, and combinations thereof.

5. The coated fertilizer granule of claim 1, wherein the gelling agent is a super absorbent polymer.

6. The coated fertilizer granule of claim 1, wherein the gelling agent comprises a polyacrylamide, polyacrylate, vegetable starch, bentonite clay, or montmorillonite clay.

7. The coated fertilizer granule of claim 1, wherein the gelling agent comprises a water absorbent polymer with a water retention ability of at least about 20 g water per g absorbent polymer.

8. The coated fertilizer granule of claim 1, wherein the water-soluble fertilizer material comprises a primary nutrient comprising urea, ammonium sulfate, calcium nitrate, diammonium phosphate, monoammonium phosphate, potassium nitrate, sodium nitrate, single superphosphate, triple superphosphate, calcium phosphate, monopotassium phosphate, dipotassium phosphate, tetra-potassium pyrophosphate, potassium metaphosphate, potassium chloride, potassium nitrate, potassium sulfate, or combinations thereof.

9. The coated fertilizer granule of claim 8, wherein the water-soluble fertilizer material further comprises a secondary nutrient comprising calcium sulfate, calcium chloride, calcium carbonate, calcium silicate, calcium phosphate, magnesium sulfate, magnesium chloride, magnesium oxide, magnesium carbonate, elemental sulfur, ammonium sulfate, or combinations thereof.

10. A fertilizer granule, comprising:
a core comprising a water-soluble fertilizer material;
a surface treatment layer comprising a surfactant and a solvent, wherein the surfactant comprises alkyl polyglycoside, ethoxylated sorbitan ester, polyhydric alcohol, or a combination thereof; and
a controlled release layer disposed between the core and the surface treatment layer, wherein the controlled release layer comprises at least one urethane layer and at least one wax layer.

11. The fertilizer granule of claim 10, wherein the controlled release layer comprises a plurality of alternating urethane and wax layers.

12. The fertilizer granule of claim 11, wherein the thickness of the controlled release layer is about 1 μm to about 150 μm.

13. The fertilizer granule of claim 10, further comprising a coating disposed between the controlled release layer and the surface treatment layer.

14. The fertilizer granule of claim 10, wherein the surfactant comprises a blend of alkyl polyglycoside, ethoxylated sorbitan ester, and polyhydric alcohol.

15. The fertilizer granule of claim 10, wherein the solvent is selected from dipropylene glycol, tripropylene glycol, glycerin, propylene carbonate, vegetable oil, and combinations thereof.

16. A method of making a coated fertilizer granule, comprising:
providing a core comprising a water-soluble fertilizer material;
applying a controlled release layer disposed over the core to form a controlled release core;
applying a coating over the controlled release core to form a coated core, wherein the coating comprises a urethane layer impregnated with a gelling agent; and
applying a surface treatment layer over the coated core, the outer surface treatment layer comprising a surfactant and a solvent, wherein the surfactant comprises alkyl polyglycoside, ethoxylated sorbitan ester, polyhydric alcohol, or a combination thereof.

17. The method of claim 16, wherein the urethane layer is formed from a reaction product of one or both of (i) a polyol blended with the gelling agent and reacted with isocyanate, and/or (ii) an isocyanate blended with the gelling agent and reacted with polyol.

18. The method of claim 16, wherein the gelling agent comprises a super absorbent polymer.

19. The method of claim 16, wherein the water-soluble fertilizer material comprises a water-soluble pesticide.

20. The method of claim 16, wherein the solvent is selected from dipropylene glycol, tripropylene glycol, glycerin, propylene carbonate, vegetable oil, and combinations thereof.

21. The method of claim 16, wherein the surfactant comprises a blend of alkyl polyglycoside, ethoxylated sorbitan ester, and polyhydric alcohol.

22. A coated fertilizer granule, consisting of:

a core comprising a water-soluble fertilizer material;

a urethane layer impregnated with a gelling agent;

a controlled release layer including at least one urethane layer and at least one wax layer and disposed between the core and the urethane layer; and a surface treatment layer disposed on the urethane layer and formed from a composition including a surfactant and a solvent, wherein the surfactant comprises alkyl polyglycoside, ethoxylated sorbitan ester, polyhydric alcohol, or a combination thereof.

23. The coated fertilizer granule of claim 22, wherein the gelling agent comprises a super absorbent polymer.

24. The coated fertilizer granule of claim 22, wherein the solvent is selected from dipropylene glycol, tripropylene glycol, glycerin, propylene carbonate, vegetable oil, and combinations thereof.

\* \* \* \* \*